(No Model.)
M. G. SHINDLE.
SEPARATING CORN SHELLER.
No. 472,181. Patented Apr. 5, 1892.
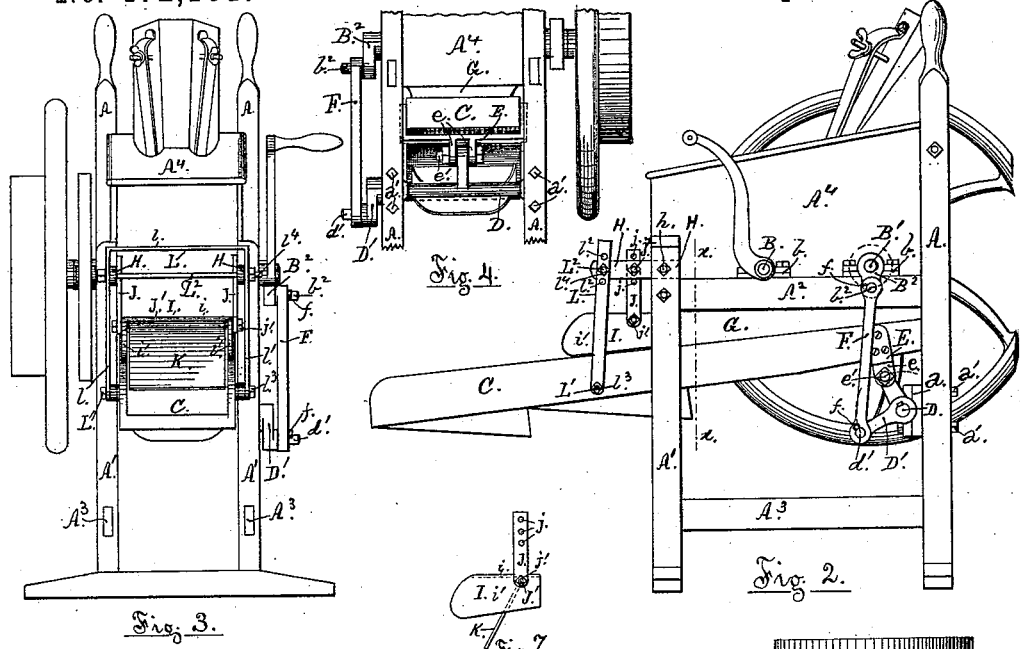
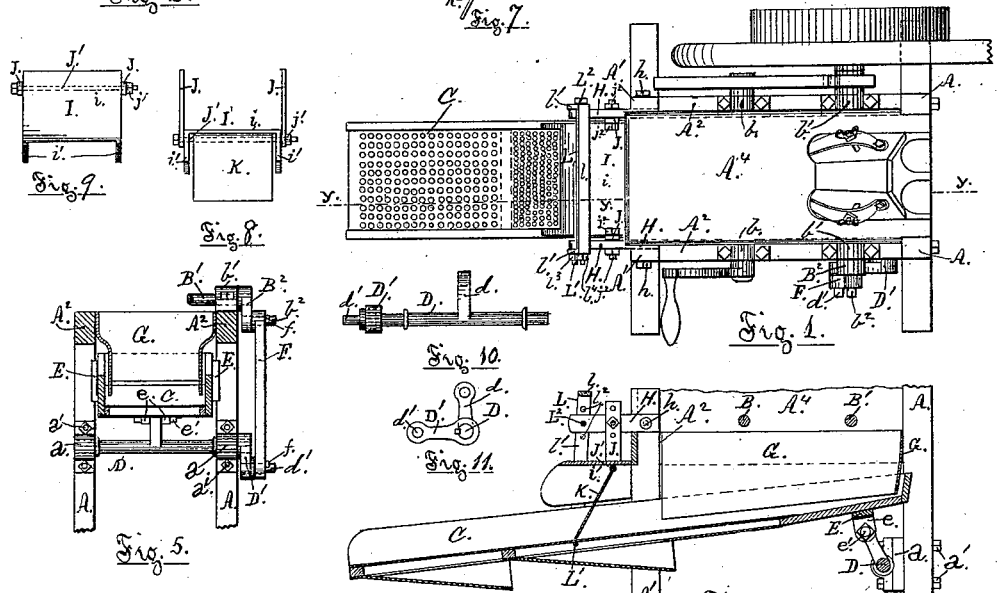
Witnesses:
W. O. Mosser
John Shaub
Inventor
Michael G. Shindle
By Dan'l H. Herr
Attorney

UNITED STATES PATENT OFFICE.

MICHAEL G. SHINDLE, OF MOUNTVILLE, PENNSYLVANIA.

SEPARATING CORN-SHELLER.

SPECIFICATION forming part of Letters Patent No. 472,181, dated April 5, 1892.

Application filed December 10, 1889. Serial No. 333,244. (No model.)

*To all whom it may concern:*

Be it known that I, MICHAEL G. SHINDLE, a citizen of the United States, residing at Mountville, in the county of Lancaster and State of Pennsylvania, have invented certain new and useful Improvements in Separating Corn-Shellers; and I do hereby declare the following to be a full, clear, and exact description of the invention, such as will enable others skilled in the art to which it appertains to make and use the same.

My invention relates to improvements in separating corn-shellers; and the objects of my invention are, first, to provide means to prevent the scattering of the corn in process of shelling, confining it to the machine, and prevent its too free passage from the action of the separator or shaker; second, to provide mechanism to support the forward end of said shaker in position under the machine and at the same time impart thereto the proper reciprocating motion, and, third, providing for the proper suspension of the rear end of said shaker, making it adjustable as to height.

I accomplish the purposes of my invention by the mechanism and devices illustrated in the several figures of the accompanying drawings, similar letters referring to similar parts throughout the several views, in which—

Figure 1 is a top view of a separating corn-sheller embodying the principles of my invention; Fig. 2, a side elevation of Fig. 1, looking up; Fig. 3, an end elevation of Fig. 2, viewed from the left; Fig. 4, a view of a portion of the right-hand end of Fig. 2, showing the rock-shaft reciprocating mechanism and supporting device in place; Fig. 5, a cross-section showing a part of the portion to the right of the line $x\ x$ in Fig. 2, showing the relative position of the side shields and shaker in place; Fig. 6, a vertical longitudinal section showing a part of the portion above the line $y\ y\ y$ in Fig. 1, showing the relative position of the shaker, the supporting and reciprocating mechanism, the side shields, retaining-box, and check-apron in place. Figs. 7, 8, and 9 are respectively side, end, and top views of the retaining-box, showing the adjustable suspending-links and check-apron in place; Figs. 10 and 11, respectively, side and end views of the rock-shaft, showing the supporting-lug and reciprocating crank in place; Figs. 12 and 13, respectively, end and side elevations of the yoke attached to the forward end of the shaker.

In a separating corn-sheller as shown in Figs. 1, 2, and 3, A designates the two forward end posts; A', the two rear end posts; $A^2$, the two upper and $A^3$ the two lower side rails mortised into the end posts, and $A^4$ the casing covering the corn-shelling mechanism.

B and B' represent shafts journaled in bearings $b$ and $b'$, resting on the side rails $A^2$, as shown in Figs. 2 and 3. The shafts B and B' support the well-known shelling and driving mechanism, which, not being part of my invention, is not here described.

C represents a separator or shaker having a double bottom, and the supporting, suspending, and actuating mechanism, being part of my invention, will now be described.

To the inner side of each post A is attached a bearing $a$ by bolts $a'$, Figs. 2 and 6. A rock-shaft D (shown in Figs. 10 and 11) is journaled in the bearings $a$, Figs. 2, 4, and 5. This shaft D is integrally provided with a vertical lug or arm $d$, adapted to support on its upper end the forward end of the shaker C, Figs. 2, 4, 5, and 6. To one extremity of this shaft is attached a crank D', provided with a crank-pin $d'$, the crank D' and the arm $d$ forming with reference to each other a right angle.

A yoke E, (shown in Figs. 12 and 13,) provided with a downwardly-projecting jaw $e$, is attached near the forward end to the shaker C, Figs. 2, 4, 5, and 6, the jaw $e$ and arm $d$ being pivotally joined by a bolt and nut $e'$. To an extremity of shaft B' is attached a crank $B^2$, provided with a crank-pin $b^2$. The crank-pins $b^2$ and $d'$ are joined by a connecting-link F, held thereto by cotter-pins $f$, Figs. 1, 2, 3, 4, and 5. The crank $B^2$ is of shorter radius than the crank D', so that the revolutions of the former will impart to the latter the proper reciprocal motion, and thus by means of the arm $d$, pivotally joined to the jaw $e$ of the yoke E, properly agitate the shaker C, to which said yoke is attached, Fig. 2.

Within the body of the corn-sheller metal sheets are attached to the upper side rails $A^2$ and extending downward over the sides and across the forward end to near the bottom of the shaker, forming a fender or shield G, adapted to prevent the shelled corn from falling outside, confining it and the dust to the action of said shaker. Just above the upper side rails and recessed into the inner faces of the rear end posts A' are two horizontal bars H, having the recessed ends attached to said posts by bolts and nuts $h$. The bars H, extending horizontally rearward, are adapted to hold in place the retaining-box and the yoke supporting the rear end of the shaker, Figs. 1, 2, 3, and 6.

A retaining-box I, consisting of a flat top $i$ and two downwardly-projecting sides $i'$, side, forward, end, and top views of which are shown, respectively, in Figs. 7, 8, and 9, is placed across the rear end of the corn-sheller and just above the shaker, Figs. 1, 2, 3, and 6. To the sides of the box I, near the upper edge, are attached the lower ends of two straps J, provided toward their upper ends each with a series of holes $j$. A bolt J', passing transversely through said box near its top, by means of a nut $j'$ serves to hold said box and straps J together, Figs. 7, 8, and 9. The bolt J', passing through a loop in its upper edge, also serves to suspend within the said box a check-apron K, made of any flexible material, Figs. 8 and 7. Said apron K, extending across the body of the box I and in a slanting direction to near the bottom of the shaker C, Figs. 3 and 6, is adapted to keep the shelled corn from flying off in this direction and to retard the too-free passage of both cobs and corn, confining them to the proper action of the shaker, Figs. 3 and 6. Two bolts and nuts $j^2$ by means of the holes $j$ serve to adjustably connect the straps J to the bars H, Figs. 1, 2, and 6.

L represents a yoke having a horizontal portion $l$ reaching across, over, and above the bars H, Figs. 1 and 3, and two downwardly-extending portions $l'$ reaching to near the lower edge of the shaker C, Figs. 2 and 3, where a bolt L', passing underneath the perforated bottom of said shaker, Fig. 6, pivotally joins the said shaker to said yoke. Each portion $l'$ near the top is provided with a series of holes $l^2$, Fig. 2, through which a bolt L$^2$ adjustably pivots the yoke L to the supporting-bars H, Figs. 1, 2, and 3, the bolts L' and L$^2$, respectively, being held in place by nuts $l^3$ and $l^4$, as shown.

I lay no claims to the corn-sheller or the shaker; but

What I do consider new, and desire to secure as my invention by Letters Patent of the United States, is—

1. The combination, in a separating corn-sheller having the shelling mechanism arranged in the upper portion of its frame-work, two corner-posts at the front and rear ends of said frame-work, a screen shaker below the shelling mechanism and extended rearward between and beyond said rear end posts, a rock-shaft journaled below and adapted to support the forward end of said shaker, and mechanism provided to oscillate said shaft to reciprocate the shaker, with the rearwardly-projecting horizontal bars H, having their forward ends rigidly secured to the rear end posts, near the tops thereof, and said bars adapted to pivotally support the rear end of the shaker and to hold the retaining-box in position, of the yoke L, having its cross-beam $l$ above, and its arms $l'$ extended downward outside of the rear ends of said bars, the lower ends of said arms $l'$ pivoted to the body of the shaker, and a series of holes $l^2$ through each of said arms near their upper ends, whereby said yoke by means of the bolt L$^2$ is pivoted to the rear ends of the bars H, substantially as described, and for the purpose set forth.

2. The combination, in a separating corn-sheller having a shaker C arranged as described, the horizontal bars H, having their forward ends secured to the rear end posts of the frame-work of the sheller, and the arms $l'$ of the yoke L, having their upper ends pivoted to the rear ends of said bars and their lower ends pivoted to the body of the shaker, with said bars H, as described, of the retaining-box I, having its top $i$ above and across the body of the shaker and its sides $i'$ extended downward to near the side walls thereof and the front edges of said top and sides against the rear end of the sheller, and the straps J, having their lower ends secured to the sides $i'$ of said box and their upper ends provided with a series of holes $j$, through which by means of the bolts and nuts $j^2$ said box is adjustably secured in position, substantially as described, and for the purpose set forth.

3. The combination, in a separating corn-sheller such as hereinbefore described and having a shaker C arranged as described, with the retaining-box I, having its top $i$ and its two depending sides $i'$ so arranged against the rear end of the sheller as to form a tunnel or covered way over the shaker and the bolt J' passed through the sides near the top of the box to hold said box in place, of the check-apron K, having its upper edge secured to said bolt to suspend said apron across the body of said box and shaker, substantially as described, and for the purpose set forth.

4. The combination, in a separating corn-sheller having the shaker C arranged as shown, and a cap or casing A$^4$ to cover the shelling mechanism, with said casing and shaker, of the fender or shield G, of metal sheeting, having the upper edge secured to the inner faces of the front and side walls of said casing and the lower edge extended over the front and side walls into the body of the shaker to near the bottom thereof, substantially as described, and for the purpose set forth.

5. The combination, in a separating corn-sheller having a shaker C, as described, means provided to pivotally support the rear end of said shaker, and the yoke E, having the central and downwardly-projecting jaw $e$ for pivoting or jointing, said yoke placed underneath and rigidly secured to the forward end of the shaker, with a yoke E, as described, of the rock-shaft D, journaled in bearings secured to the front end posts, as shown, and having at its center the vertical lug or arm $d$, having its extremity pivoted to the jaw $e$, as shown, to support the forward end of the shaker, and mechanism provided to oscillate or rock said shaft and to reciprocate said shaker, substantially as described, and for the purpose set forth.

In testimony whereof I affix my signature in presence of two witnesses.

MICHAEL G. SHINDLE.

Witnesses:
J. L. LYTE,
H. REESE.